UNITED STATES PATENT OFFICE 2,660,587

8-HYDROXY-4-ANDROSTENE-3,17-DIONE

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952, Serial No. 296,733

1 Claim. (Cl. 260—397.4)

This invention relates to a novel steroid, more particularly 8-hydroxy-4-androstene-3,17-dione.

This application is a continuation-in-part of our applications Serial No. 272,944, filed February 23, 1952, now Patent 2,602,769, issued July 8, 1952, and Serial No. 292,724, filed June 10, 1952.

It is an object of the present invention to provide the novel compound 8-hydroxy-4-androstene-3,17-dione, having both chemical and pharmacological utility.

The novel compound of the present invention has the following structural formula:

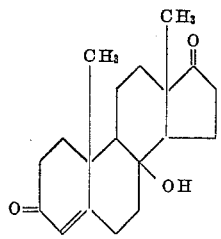

The following example is illustrative of the process for the production of the product of the present invention but is not to be construed as limiting.

PREPARATION.—8,17a,21-TRIHYDROXY-4-PREGNENE-3,20-DIONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with spores of *Helicostylum piriforme*, American Type Culture Collection Number 8992, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Helicostylum piriforme* was added two grams of compound S, 17a,21-dihydroxy-4-pregnene-3,20-dione, in a minimum of ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in a minimum of methylene chloride, filtered and the solvent then evaporated. The resulting crude crystals were dried and then washed five times with five-milliliter portions of ether per gram of crude crystals, yielding 5.354 grams of residue. The residue was dissolved in ten milliliters of ethylene dichloride and chromatographed over 350 grams of Florisil synthetic magnesium silicate using 550-milliliter portions of developing solvent fractions as indicated in the table.

TABLE

*Helicostylum piriforme*

| Fraction | Solvent | Eluate Solids, Milligrams |
|---|---|---|
| 1 | ethylene dichloride | 479.5 |
| 2 | do | 403.0 |
| 3 | ethylene dichloride-acetone 15:1 | 815.5 |
| 4 | do | 36.5 |
| 5 | ethylene dichloride-acetone 12:1 | 36.0 |
| 6 | do | 50.0 |
| 7 | do | 109.5 |
| 8 | ethylene dichloride-acetone 10:1 | 159.0 |
| 9 | do | 148.0 |
| 10 | ethylene dichloride-acetone 8:1 | 145.0 |
| 11 | do | 104.5 |
| 12 | do | 98.0 |
| 13 | ethylene dichloride-acetone 5:1 | 170.0 |
| 14 | do | 123.0 |
| 15 | do | 123.5 |
| 16 | ethylene dichloride-acetone 3:1 | 127.5 |
| 17 | do | 200.0 |
| 18 | ethylene dichloride-acetone 1:1 | 456.0 |
| 19 | do | 356.0 |
| 20 | acetone | 226.5 |

Eluate fractions 18 and 19, freed of solvent, were washed twice with five milliliters of equal parts of methanol and acetone leaving a residue of 63 milligrams. Recrystallization twice from three-milliliter portions of methanol produced crystals of 8,17a,21-trihydroxy-4-pregnene-3,20-dione, melting point 248 to 252 degrees centigrade, $[\alpha]_D^{23}$ of plus 107 degrees (0.946 in dioxane). The mother liquors of fractions 18 and 19 were combined with fractions 17 and 20 and rechromatographed over Florisil synthetic magnesium silicate to give an additional 114.3 milligrams of this compound.

*Analysis.*—Calculated for $C_{21}H_{30}O_5$: C, 69.58; H, 8.34. Found: C, 69.46; H, 8.46.

*Example.—8-hydroxy-4-androstene-3,17-dione*

To sixty milliliters of 4-pregnene-8,17α,21-triol-3,20-dione dissolved in five milliliters of glacial acetic acid there was added dropwise a solution of 50.7 milligrams of chromium trioxide in three milliliters of 95 percent acetic acid. After twenty hours at room temperature, the solution was diluted with twenty milliliters of methanol and the methanol was evaporated at a temperature of fifty degrees centigrade in vacuo. The residue was taken up in thirty milliliters of water and extracted with three portions, thirty milliliters each, of a mixture of ten parts of ether with one part of chloroform. The extract was washed with five-milliliter portions: once with water, once with five percent sodium hydroxide, and four times with water. The washed extract was dried over anhydrous sodium sulfate, filtered and evaporated to produce 38.7 milligrams of crystals, which upon recrystallization from two milliliters of acetone, yielded 8-hydroxy-4-androstene-3,17-dione, having a melting point of 214 to 217 degrees centigrade. Infrared, ultraviolet and micro-analysis confirmed the structure.

*Analysis.*—Calculated for $C_{21}H_{26}O_3$: C, 75.46; H, 8.66. Found: C, 75.49; H, 9.21.

The 8-hydroxy-4-androstene-3,17-dione of this invention is useful in the synthesis of physiologically active steroids. For example, dehydration followed by hydrogenation will produce androstanedione. The novel 8-hydroxy-4-androstene-3,17-dione demonstrates androgenic, anesthetic, and anabolic activities.

It is to be understood that the invention is not to be limited to the exact details of operation or exact compounds shown and described as obvious modifications and equivalents will be apparent to one skilled in the art and the invention is to be limited only by the scope of the appended claim.

We claim:

8-hydroxy-4-androstene-3,17-dione.

HERBERT C. MURRAY.
DUREY H. PETERSON.

No references cited.